United States Patent
Rácz et al.

(10) Patent No.: US 9,277,047 B2
(45) Date of Patent: Mar. 1, 2016

(54) TECHNOLOGY FOR OPERATING NETWORK NODES OF A COMMUNICATION NETWORK

(71) Applicant: Telefonaktiebolaget L M Ericsson (publ), Stockholm (SE)

(72) Inventors: András Rácz, Budapest (HU); Per Elmdahl, Linköping (SE); Karl Norrman, Stockholm (SE); Robert Petersen, Linköping (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/387,066

(22) PCT Filed: Mar. 22, 2013

(86) PCT No.: PCT/EP2013/056162
§ 371 (c)(1),
(2) Date: Sep. 22, 2014

(87) PCT Pub. No.: WO2013/139984
PCT Pub. Date: Sep. 26, 2013

(65) Prior Publication Data
US 2015/0065083 A1 Mar. 5, 2015

Related U.S. Application Data

(60) Provisional application No. 61/614,151, filed on Mar. 22, 2012.

(51) Int. Cl.
*H04M 11/00* (2006.01)
*H04M 3/22* (2006.01)
*H04W 24/08* (2009.01)

(52) U.S. Cl.
CPC ............ *H04M 3/2281* (2013.01); *H04W 24/08* (2013.01)

(58) Field of Classification Search
CPC ............................ H04M 3/2281; H04W 24/08
USPC .......................................................... 455/405
See application file for complete search history.

(56) References Cited

U.S. PATENT DOCUMENTS

2009/0312001 A1\* 12/2009 Bodog ........................ 455/418
2011/0319115 A1 12/2011 Rácz (Continued)

OTHER PUBLICATIONS

3rd generation partnership project; Technical Specification Group Services and System Aspects; Telecommunication management; Subscriber and equipment trace; Trace control and configuration management . 3GPP Standard; 3GPP TS 32.422, No. V11.3.0, Mar. 16, 2012, pp. 1-121, XP050580442.\*

(Continued)

*Primary Examiner* — Tanmay Shah
(74) *Attorney, Agent, or Firm* — Myers Bigel & Sibley, P.A.

(57) ABSTRACT

A method includes: a) assigning, at a MME, after initiation of a user session of an UE, a correlation ID to the user session; b) defining, at the MME, in response to an initiation of a first trace session of the UE during the user session, a first mapping correlation which maps a first trace ID reflecting the first trace session, to the correlation ID, and sending the first mapping correlation to a TCE; and c) defining, at the MME, in response to an initiation of a second trace session of the UE during the user session, a second mapping correlation which maps a second trace ID reflecting the second trace session, to the correlation ID, and sending the second mapping correlation to the TCE. The first and second mapping correlation enable the TCE to assign trace session information to the user session.

19 Claims, 6 Drawing Sheets

(56) References Cited

U.S. PATENT DOCUMENTS

2013/0114446 A1* 5/2013 Liu et al. .................. 370/252
2013/0128756 A1* 5/2013 Zhang et al. .............. 370/252

OTHER PUBLICATIONS

Alcatel-Lucent et al. "Clarifying TR/TRSR combination per trace session associated with a UE", 3GPP Draft; S5-110266, Jan. 15, 2011, XP050646523.*
International Search Report and Written Opinion of the International Searching Authority, PCT Application No. PCT/EP2013/056162, Jun. 18, 2013.
International Preliminary Report on Patentability, PCT Application No. PCT/EP2013/056162, Jul. 7, 2014.
Alcatel-Lucent et al., "Clarify TR/TRSR combination per trace session associated with a UE", 3GPP TSG-SA5 (Telecom Management), S5-110-266, Meeting SA5#75, Jan. 24-28, 2011, Sorrento, Italy, 6 pp.
RAN2, "LS on Location Information for MDT", Release 10, Work Item: Minimisation of Drive Tests, 3GPP TSG-RAN2 Meeting #70, Tdoc R2-103461, Montreal, Canada, May 10-14, 2010, 1 p.
SA5, "Output of discussion on requirements for management of UE based network performance measurements", Agenda Item: 6.9.3, 3GPP TSG-SA5 (Telecom Management), S5-101506, Meeting SA5#71, Montreal, Canada, May 10-14, 2010, 1 p.
3GPP, Technical Specification, "3rd Generation Partnership Project; Technical Specification Group Services and System Aspects; Telecommunication management; Subscriber and equipment trace; Trace concepts and requirements (Release 11)", 3GPP TS 32.421 V11.2.0 (Mar. 2012), 37 pp.
3GPP, Technical Specification, "3rd Generation Partnership Project; Technical Specification Group Services and System Aspects; Telecommunication management; Subscriber and equipment trace; Trace control and configuration management (Release 11)", 3GPP TS 32.422 V11.3.0 (Mar. 2012), 121 pp.
3GPP, Technical Specification, "3rd Generation Partnership Project; Technical Specification Group Services and System Aspects; Telecommunication management; Subscriber and equipment trace; Trace data definition and management (Release 11)", 3GPP TS 32.423 V11.3.0 (Dec. 2012), 83 pp.
3GPP, Technical Specification, "3rd Generation Partnership Project; Technical Specification Group Radio Access Network; Evolved Universal Terrestrial Radio Access Network (E-UTRAN); Stage 2 functional specification of User Equipment (UE) positioning in E-UTRAN (Release 11)", 3GPP TS 36.305 V11.1.0 (Sep. 2012), 58 pp.
3GPP, Technical Specification, "3rd Generation Partnership Project; Technical Specification Group Radio Access Network; Stage 2 functional specification of User Equipment (UE) positioning in UTRAN (Release 11)", 3GPP TS 25.305 V11.0.0 (Sep. 2012), 80 pp.
3GPP, Technical Specification, "3rd Generation Partnership Project; Technical Specification Group Radio Access Network; Evolved Universal Terrestrial Radio Access (E-UTRA); LTE Positioning Protocol A (LPPa) (Release 11)", 3GPP TS 36.455 V11.1.0 (Dec. 2012), 52 pp.
3GPP, Technical Specification, "3rd Generation Partnership Project; Technical Specification Group Radio Access Network; Evolved Universal Terrestrial Radio Access (E-UTRA); LTE Positioning Protocol (LPP) (Release 11)", 3GPP TS 36.355 V11.0.0 (Sep. 2012), 117 pp.

* cited by examiner

TECHNOLOGY FOR OPERATING NETWORK NODES OF A COMMUNICATION NETWORK

CROSS REFERENCE TO RELATED APPLICATIONS

This application is a 35 U.S.C. §371 national stage application of PCT International Application No. PCT/EP2013/056162, filed on 22 Mar. 2013, which itself claims priority to U.S. provisional Patent Application No. 61/614,151, filed 22 Mar. 2012, the disclosure and content of both of which are incorporated by reference herein in their entirety. The above-referenced PCT International Application was published in the English language as International Publication No. WO 2013/139984 A1 on 26 Sep. 2013.

TECHNICAL FIELD

The present invention relates to a method of operating a Mobility Management Entity (MME) within a communication network. Further, the present invention relates to a method of operating a Trace Collecting Entity (TCE) within a communication network. The present invention also relates to a method of operating a communication network, and to a MME and a TCE.

BACKGROUND

A plurality of existing communication networks like the 3GPP communication networks, 2G/3G communication networks, and newly emerging SAE/LTE communication networks support the possibility to trace activities of users in the communication network. The users to be traced can for example be selected based on user identity (IMSI (International Mobile Subscriber Identity) based trace), terminal identity (IMEI (International Mobile Station Equipment Identity) based trace) or location (cell based trace). During tracing, all network activities related to the particular user can be logged and later on delivered to a central management entity of the communication network for evaluation. Logged network activities include for example signaling messages sent/received either on radio interfaces or network node interfaces.

Information obtained by tracing may for example be used to troubleshoot problematic user connections (e.g., in response to user complaints) or to monitor generic network performance and to perform root cause analysis to identify communication network problems. Nowadays, 3GPP communication networks offer the concept of "User Entity (UE) based network performance measurements", also called, Minimization of Drive Test (MDT) measurements, in which measurements carried out by the UEs are used for network performance monitoring and optimization purposes. MDT measurements are carried out for states where the UE is connected (connection mode) to the communication network as well as for states where the UE is not connected (idle mode). The measurements where the UE is connected to the communication network are also called immediate MDT measurements since the UE reports the measurements when they are performed via legacy RRC (Radio Resource Protocol) protocol mechanisms, i.e., there is no internal logging in the UE. The measurements where the UE is not connected are also called logged MDT measurements since the MDT measurements are collected and logged in the UE; in this case, the collected MDT measurements are reported to a network node of the communication network in a bunch as soon as the UE is connected to the communication network again (logged reporting in idle mode is necessary since the UE does not have an active connection to the network in idle mode and thereby cannot report the measurements at the time when they are taken).

In order to manage MDT UE measurements in 3GPP communication networks, trace functionality is used. This means that a network management system which manages the communication network can configure and collect measurements using trace methods.

In current 3GPP communication networks there are two ways to activate tracing, namely "signaling based activation" or "management based activation". In signaling based activation, the trigger for tracing a particular user (UE) is propagated piggy-backed on a regular UE-specific signaling message sent between the network nodes through which a user flow passes. Initially, the network management system configures tracing of a particular user (UE) in a HSS (Home Subscriber System) or in core network nodes (e.g., MME, SGSN (Serving GPRS Support Node)) based on the user IMSI or IMEI. As soon as the user with the given IMSI or IMEI appears in the communication network, and the HSS, MME or SGSN etc. is interrogated for user information (e.g., security credentials at a user attach), a trace trigger will be propagated to related network nodes via the invoked signaling flow. In management based activation, the trace trigger is not propagated to other network nodes. The management system configures selected network nodes to trace a particular user or set of users. When a new user appears at a network node, the network node evaluates a selection criteria and starts trace recording in case the condition is satisfied.

In current communication standards, if MDT measurements are taken using trace collection, the concept of "user consent" has to be taken into account (for privacy reasons). The concept of user consent provides a control for the user to allow or reject the collection of MDT measurements. The consent for MDT measurement collection is stored as part of subscription data, and when no positive user consent is available for a particular user, the communication network is not allowed to initiate MDT measurement collection for that user. This applies both for IMSI based measurement collection and cell based MDT measurement collection. Moreover, no user identity, i.e., IMSI or IMEI information is allowed to be sent to a TCE in case of an area based MDT measurement collection, not even if a user consent is available. This means that only the trace session ID and trace recording session ID are provided to the TCE together with the trace records, but no information which would allow to map the MDT measurements to unique user identities. Further, in the case of cell based tracing, a trace session ID and a trace recording session ID are changing when the UE switches from one cell to another cell. Similarly, different trace IDs are assigned to different trace jobs. Also, in current communication standards, a separate trace job type is defined for the collection of Radio Link Failure (RLF) reports, for which the user consent does not apply. All RLF reports received from UEs directly (or via neighbor cells on X2) are collected and reported in one single trace session. In this case there is no possibility to identify which user has generated the RLF report.

In view of the above circumstances, the value of the collected MDT measurement information is decreased since it is not clear to which user the collected MDT measurement information belongs.

SUMMARY

It is an objective of the present invention to provide a technique based on which the value of the collected MDT measurement information can be increased.

According to an aspect of the present invention, a method of operating a MME within a communication network comprising a radio access network and a core network connected to the radio access network is provided. The radio access network comprises a plurality of base stations wirelessly connected to a plurality of mobile UEs. The MME is part of the core network. The method comprises: a) assigning, at the MME, after initiation of a user session of an UE, a correlation ID to the user session; b) defining, at the MME, in response to an initiation of a first trace session of the UE during the user session, a first mapping correlation which maps a first trace ID reflecting the first trace session, to the correlation ID, and sending the first mapping correlation to a TCE; and c) defining, at the MME, in response to an initiation of a second trace session of the UE during the user session, a second mapping correlation which maps a second trace ID reflecting the second trace session, to the correlation ID, and sending the second mapping correlation to the TCE. The first mapping correlation and the second mapping correlation enable the TCE to assign trace session information collected during the first trace session and the second trace session to the user session.

An advantage of this method is that different pieces of information (pieces of MDT measurements) that belong to the same UE session can be correlated without using UE identity information (IMSI, IMEI) even if the pieces of information have been collected in different cells or in different trace jobs. Thus, privacy requirements (hiding of UE identity information (IMSI, IMEI)) can be fulfilled. In this way, it is for example possible to correlate RLF events and MDT measurements; thus, it is possible to see what has happened before and after a radio link failure. Further, for example, it is possible to analyse sequences of measurements before and after a handover of a UE when the UE switches from one cell to another.

The MME may transmit the first mapping correlation and the second mapping correlation from the MME directly to the TCE. Alternatively, the MME may transmit the first mapping correlation and the second mapping correlation from the MME indirectly to the TCE by sending them to at least one base station which, before sending trace session information to the TCE, includes the corresponding mapping correlation into the trace session information. In the case that the MME transmits the first mapping correlation and the second mapping correlation from the MME indirectly to the TCE by sending them to at least one base station, the wording "including the mapping correlation into the trace session information" may mean that the complete mapping correlation is included into the trace session information, or may mean that only a part of the mapping correlation is included into the trace session information. That is, it is sufficient to include only the correlation ID of the mapping correlation (first part of the mapping correlation) into the trace session information since the trace session information comprises the trace ID (second part of the mapping correlation) anyhow (it is needed in order to identify the trace session information). In this case, it is sufficient to send only the correlation ID from the MME to the base station. In the case of a handover process where the responsibility for the UE changes from the base station to a further base station, the base station may pass the correlationID to the further base station, the further base station including the correlationID into the trace session information collected by the further base station before sending it to the TCE.

The correlation ID may be assigned to the user session such that it is unique with regard to other correlation IDs assigned by the MME to user sessions of other UEs. Thus, the correlation ID may not be "totally unique" with regard to the complete communication network (i.e. with regard to activities of other MMEs which may also generate and handle correlation IDs), but "sufficiently unique" (in a statistical sense) with regard to the complete communication network to achieve reliable correlation results in the sense that the probability that different MMEs generate the same correlation ID for different UEs at the same time is sufficiently low.

The assignment of the correlation ID to the user session of the UE may be released after the user session has been terminated. The beginning and ending of a user session may be differently in various ways depending on the application. For example, the user session may be defined as the period from the time the UE establishes a connection to the radio access network (CONNECTED state) until it terminates the connection to the radio access network (DISCONNECTED state). Alternatively, the user session may be defined as the period from the time the UE establishes a connection to the core network (ATTACHED state) until it terminates the connection to the core network (DETACHED state).

The assignment of the correlation ID to the user session of the UE may even be released during a user session, for example when the circumstances of the user session ("mode" of user session) have changed such that it is unnecessary to further collect or correlate MDT measurement data during the user session. For example, the assignment of the correlation ID to the user session of the UE may be released during the user session when the first trace session or the second trace session is deactivated, when a predetermined time period expires, or when the UE leaves a predefined geographical area and enters a geographical area where it does not make sense to collect MDT measurement data. Releasing the assignment of the correlation ID to the user session of the UE during the user session has the advantage that MDT measurement data is not unnecessarily collected.

In response to a release of an assignment of the correlation ID to the user session of the UE, and in response to an initiation of a further user session for the UE, above described method steps a) to c) may be repeated for the further user session. Alternatively, the assignment of the correlation ID to the user session of the UE may not be released at the end of a user session or during the user session, but may be static and permanently assigned to the UE. This enables to correlate MDT measurement data of a UE collected over a plurality of user sessions (e.g. in order to analyze a long term behavior of a user (UE)).

The correlation ID may comprise at least one of: a combination of a trace session ID and a MME ID, a combination of a trace session ID and a trace session recording ID, a string or a number obtained by a function having an IMSI as an input parameter, a random number, a Temporary-IMSI, or a function thereof. Other combinations are possible. Generally, as already mentioned, the correlation ID should be generated such that the statistical likelihood that there are conflicts with other the correlation IDs generated by other MMEs is below a sufficiently low threshold value which guarantees that reliable correlation results are obtained.

The correlation ID may be generated within the MME. Alternatively, it may be generated by another component of the communication network and sent to the MME.

In case that the assignment of the correlation ID to the user session of the UE is released, the MME may inform the TCE about the release. This has the advantage that MDT measurement data is not unnecessarily correlated at the TCE.

The trace session information may include both a trace session reference and a trace recording session reference.

In response to an initiation of the first trace session or second trace session of the UE by a base station, it may be examined by the MME whether information has been received from the base station which indicates that a mapping correlation is required during the first trace session or second trace session, wherein the MME only creates the mapping correlation and sends it to the TCE if such information has been received by the base station. In this way, a correlation ID is only generated or provided if it is actually needed (i.e. if MDT measurement information actually has to be correlated).

A "primary" (old) MME may transmit the correlation ID to a new, "secondary" MME during the user session when the responsibility for handling a user session of a UE is shifted to the another MME. The other MME may then handle the MDT data collection and processing in the same manner as indicated above for the primary MME.

According to an aspect of the present invention, a method of operating a TCE within a communication network comprising a radio access network and a core network connected to the radio access network is provided. The radio access network comprises a plurality of base stations wirelessly connected to a plurality of UEs. The method comprises: a) receiving, at the TCE, after initiation of a user session of an UE and in response to an initiation of a first trace session of the UE during the user session, a first mapping correlation which maps a first trace ID reflecting the first trace session, to a correlation ID assigned to the user session, from a MME which is part of the core network; b) assigning, at the TCE, first trace session information collected during the first trace session to the user session using the first mapping correlation; c) receiving, at the TCE, in response to an initiation of a second trace session of the UE during the user session, a second mapping correlation which maps a second trace ID reflecting the second trace session, to the correlation ID, from the MME; and d) assigning, at the TCE, second trace session information collected during the second trace session to the user session using the second mapping correlation.

According to an aspect of the present invention, a method of operating a communication network comprising a radio access network and a core network connected to the radio access network is provided. The radio access network comprises a plurality of base stations wirelessly connected to a plurality of mobile UEs. The core network comprises a MME. The method comprises: a) assigning, at the MME, after initiation of a user session of an UE, a correlation ID to the user session; b) defining, at the MME, in response to an initiation of a first trace session of the UE during the user session, a first mapping correlation which maps a first trace ID reflecting the first trace session, to the correlation ID, and sending the first mapping correlation to a TCE; c) assigning, at the TCE, first trace session information collected during the first trace session to the user session using the first mapping correlation; d) defining, at the MME, in response to an initiation of a second trace session of the UE during the user session, a second mapping correlation which maps a second trace ID reflecting the second trace session, to the correlation ID, and sending the second mapping correlation to the TCE; and e) assigning, at the TCE, second trace session information collected during the second trace session to the user session using the second mapping correlation.

According to an aspect of the present invention, a computer program product is provided comprising program code portions for performing the steps of any one of the embodiments of the present invention when the computer program product is executed on one or more computing devices.

The computer program product may be stored on a computer-readable recording medium.

According to an aspect of the present invention, a MME is provided which can be operated within a communication network comprising a radio access network and a core network connected to the radio access network, wherein the radio access network comprises a plurality of base stations wirelessly connected to a plurality of mobile UEs. The MME comprises a processing unit adapted to: a) assign, after initiation of a user session of an UE, a correlation ID to the user session; b) define, in response to an initiation of a first trace session of the UE during the user session, a first mapping correlation which maps a first trace ID reflecting the first trace session, to the correlation ID; and c) define, in response to an initiation of a second trace session of the UE during the user session, a second mapping correlation which maps a second trace ID reflecting the second trace session, to the correlation ID. The MME further comprises a transmitting unit adapted to send the first mapping correlation and the second mapping correlation to a TCE. The first mapping correlation and the second mapping correlation enable the TCE to assign trace session information collected during the first trace session and the second trace session to the user session.

According to an aspect of the present invention, a TCE is provided which can be operated in a communication network comprising a radio access network and a core network connected to the radio access network, wherein the radio access network comprises a plurality of base stations wirelessly connected to a plurality of mobile UEs. The TCE comprises a receiving unit adapted to: a) receive, after initiation of a user session of an UE and in response to an initiation of a first trace session of the UE during the user session, a first mapping correlation which maps a first trace ID reflecting the first trace session, to a correlation ID assigned to the user session, from a MME; b) receive, in response to an initiation of a second trace session of the UE during the user session, a second mapping correlation which maps a second trace ID reflecting the second trace session, to the correlation ID, from the MME. The TCE further comprises a processing unit adapted to assign first trace session information collected during the first trace session to the user session using the first mapping correlation and second trace session information collected during the second trace session to the user session using the second mapping correlation.

BRIEF DESCRIPTION OF THE DRAWINGS

In the following, the present disclosure will be described in more detail with reference to exemplary embodiments illustrated in the drawings, wherein.

DETAILED DESCRIPTION

In the following description, for purposes of explanation and not limitation, specific details are set forth, such as specific device and system configurations and specific methods, steps and functions, in order to provide a thorough understanding of the technique presented herein. It will be appreciated that this technique may be practiced in other embodiments that depart from these specific details. As an example, while several embodiments will be described in connection with the DASH and FLUTE protocols, it will be appreciated that the present disclosure can also be practiced in connection with other protocols.

Those skilled in the art will further appreciate that the methods, steps and functions described herein may be implemented using individual hardware circuitry, using software functioning in conjunction with a program microprocessor or general purpose computer, using one or more Application Specific Integrated Circuits (ASICs), one or more Digital Signal Processors (DSPs) and/or one or more Field Programmable Gate Arrays (FPGAs). It will also be appreciated that the technique disclosed herein may be embodied in a processor and a memory coupled to the processor, wherein the memory stores one or more programs that perform the methods, steps and functions described herein when executed by the processor.

With respect to the following embodiments, the same reference numerals are used to denote the same or similar components.

Figure 1:
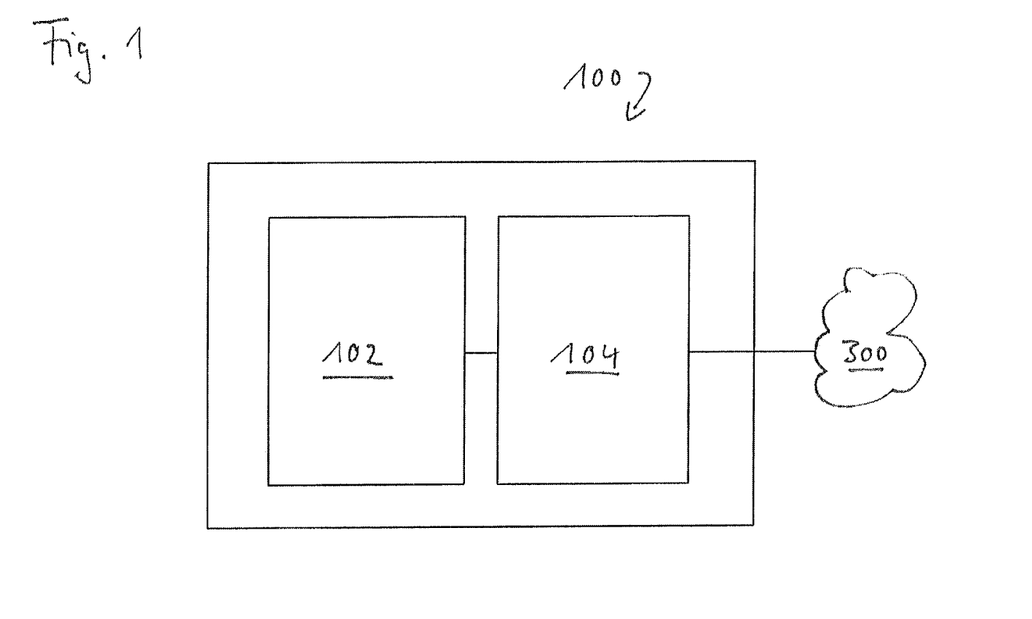
FIG. 1 shows a schematic drawing of a MME according to an embodiment of the present invention.

FIG. 1 shows a MME 100 which can be operated within a communication network 300 comprising a radio access network and a core network connected to the radio access network, wherein the radio access network comprises a plurality of base stations wirelessly connected to a plurality of mobile UEs. The MME 100 comprises a processing unit 102 adapted to: a) assign, after initiation of a user session of an UE, a correlation ID to the user session; b) define, in response to an initiation of a first trace session of the UE during the user session, a first mapping correlation which maps a first trace ID reflecting the first trace session, to the correlation ID; and c) define, in response to an initiation of a second trace session of the UE during the user session, a second mapping correlation which maps a second trace ID reflecting the second trace session, to the correlation ID. The MME further comprises a transmitting unit 104 connected to the processing unit 102 and the communication network 300 and adapted to send the first mapping correlation and the second mapping correlation to a TCE. The first mapping correlation and the second mapping correlation enable the TCE to assign trace session information collected during the first trace session and the second trace session to the user session.

Figure 2:
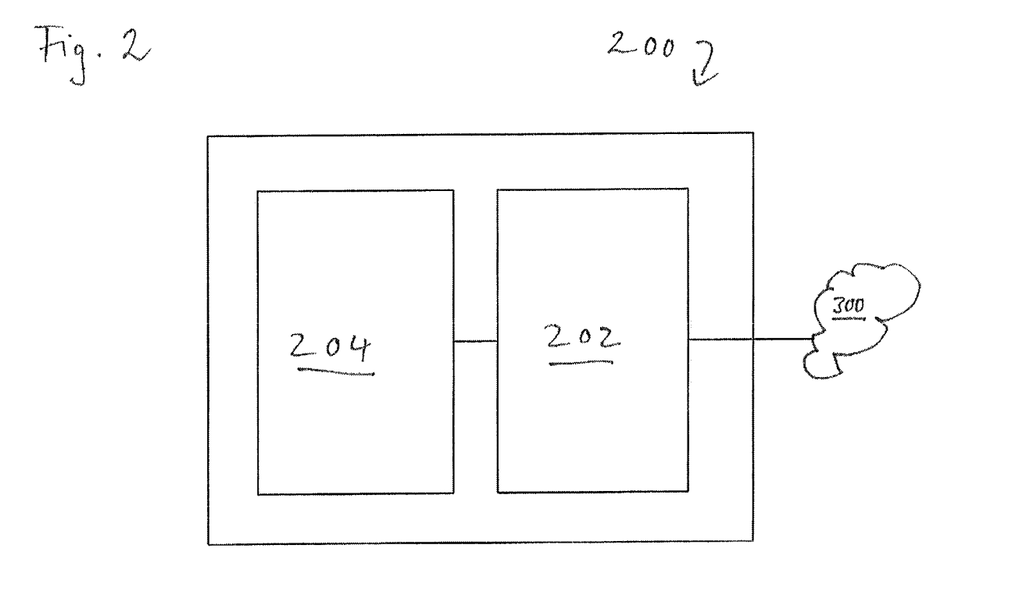
FIG. 2 shows a schematic drawing of a TCE according to an embodiment of the present invention.

FIG. 2 shows a TCE 200 which can be operated in a communication network 300 comprising a radio access network and a core network connected to the radio access network, wherein the radio access network comprises a plurality of base stations wirelessly connected to a plurality of mobile UEs. The TCE 200 comprises a receiving unit 202 connected to the communication network 300 adapted to: a) receive, after initiation of a user session of an UE and in response to an initiation of a first trace session of the UE during the user session, a first mapping correlation which maps a first trace ID reflecting the first trace session, to a correlation ID assigned to the user session, from a MME; b) receive, in response to an initiation of a second trace session of the UE during the user session, a second mapping correlation which maps a second trace ID reflecting the second trace session, to the correlation ID, from the MME. The TCE further comprises a processing unit 204 connected to the receiving unit 202 and adapted to assign first trace session information collected during the first trace session to the user session using the first mapping correlation and second trace session information collected during the second trace session to the user session using the second mapping correlation.

Figure 3:
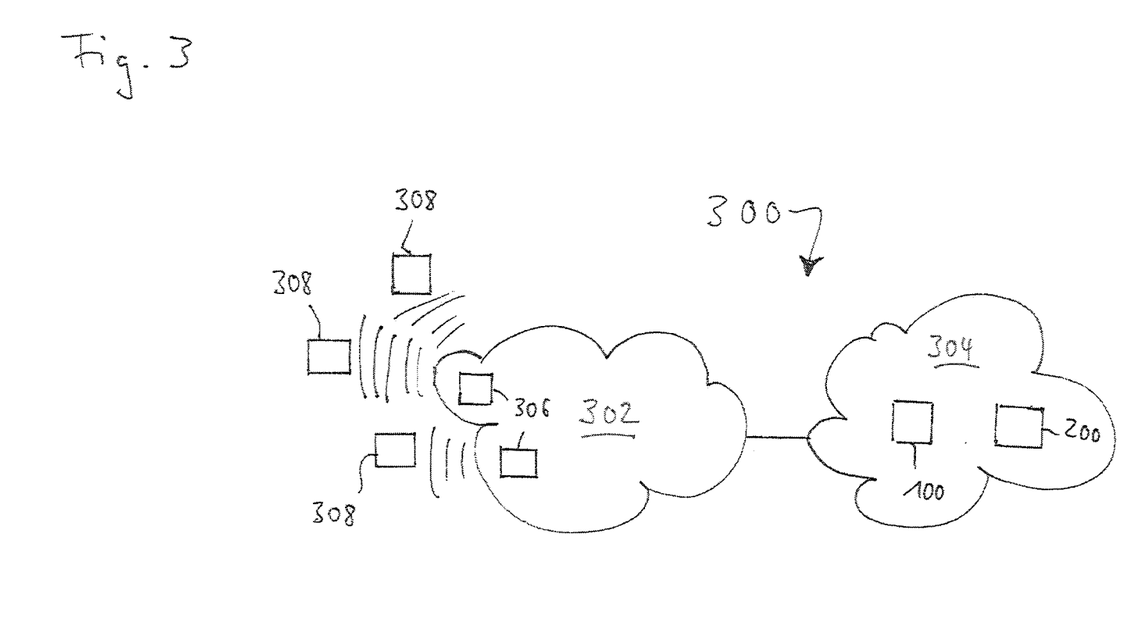
FIG. 3 shows a schematic drawing of a communication network according to an embodiment of the present invention.

FIG. 3 shows an example of the communication network 300 to which the MME 100 and the TCE 200 are connected. The communication network 300 comprises a radio access network 302 and a core network 304 connected to the radio access network 302, wherein the radio access network 302 comprises a plurality of base stations 306 wirelessly connected to a plurality of mobile UEs 308. In this embodiment, the TCE 200 is located in the core network 304. However, the TCE 200 may also be located at any other location in the communication network 300. The MME is located in the core network 304.

Figure 4:
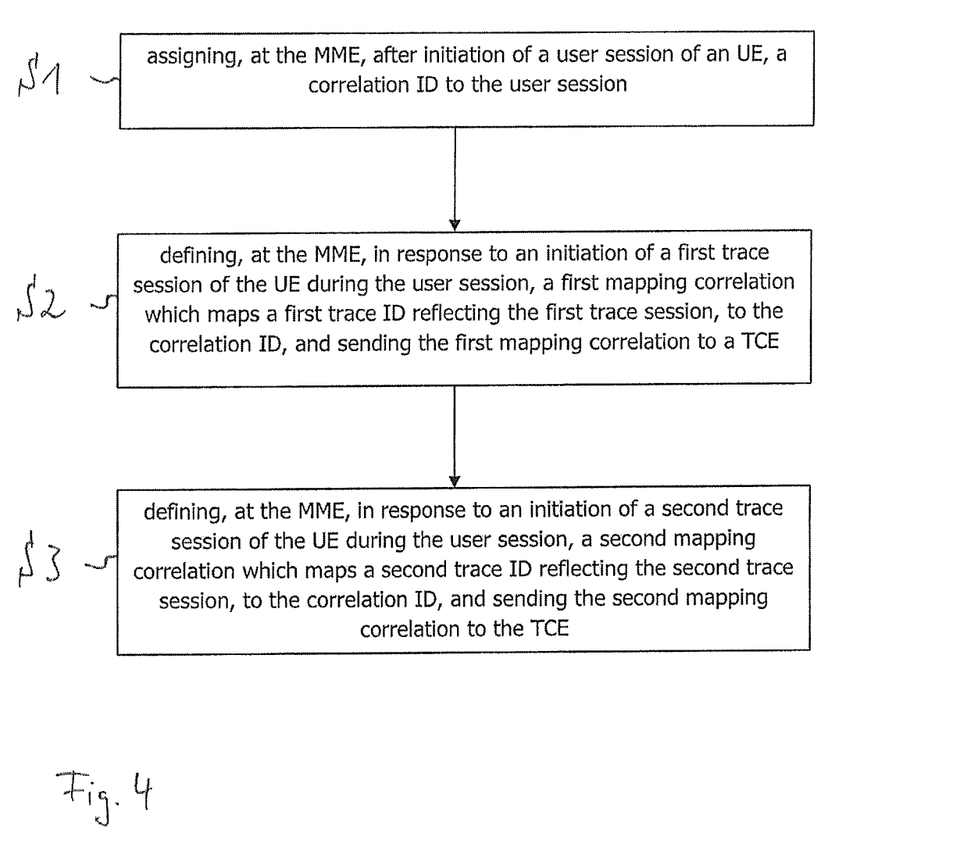
FIG. 4 shows a schematic flowchart of a method of operating an MME according to an embodiment of the present invention.

Using the MME 100 and the TCE 200 as shown in FIGS. 1 to 3, the following method may be carried out, as shown in FIG. 4: At S1, at the MME 100, after initiation of a user session of an UE 308, a correlation ID is assigned to the user session. At S2, at the MME 100, in response to an initiation of a first trace session of the UE during the user session, a first mapping correlation is defined which maps a first trace ID reflecting the first trace session to the correlation ID, and the first mapping correlation is sent to the TCE 200 via the communication network 300. At S3, at the MME 100, in response to an initiation of a second trace session of the UE 308 during the user session, a second mapping correlation is defined which maps a second trace ID reflecting the second trace session, to the correlation ID, and sending the second mapping correlation to the TCE 200. The first mapping correlation and the second mapping correlation enable the TCE 200 to assign trace session information collected during the first trace session and the second trace session to the user session.

Figure 5:
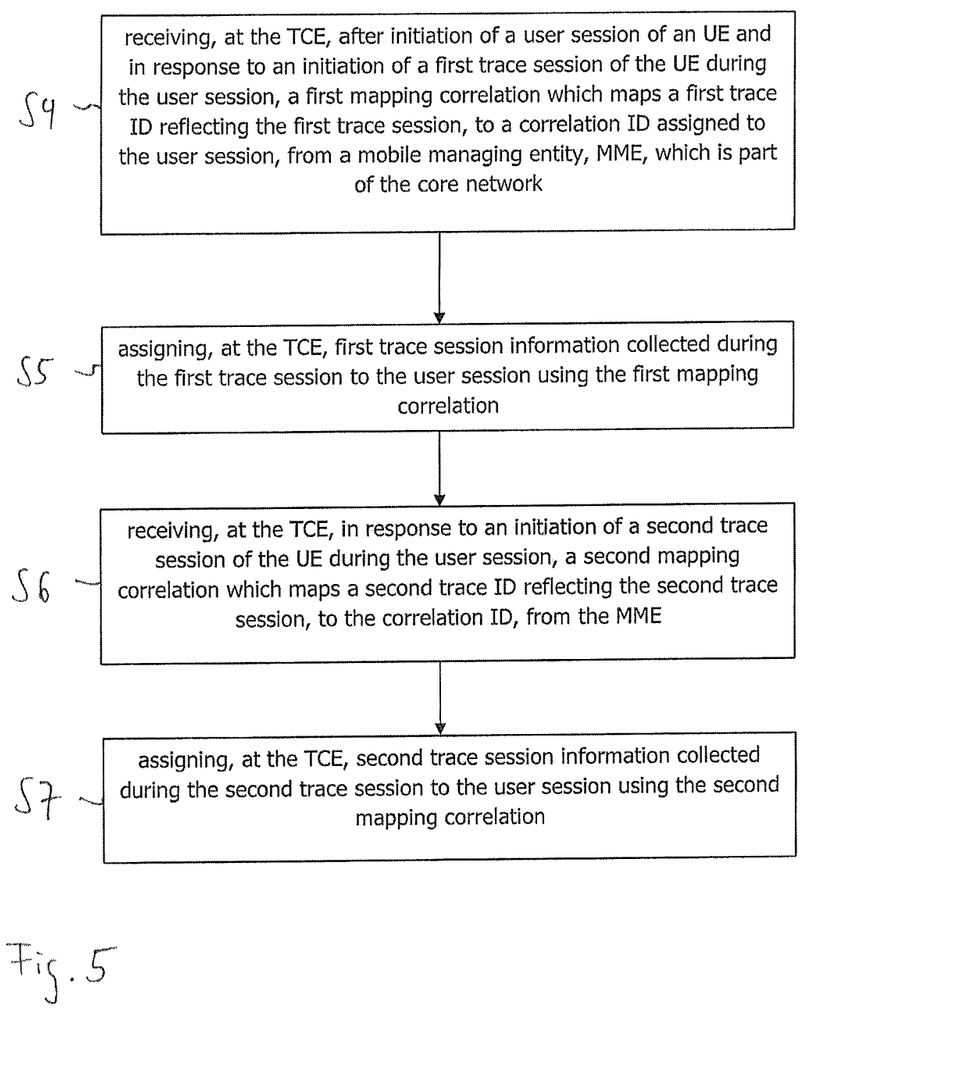
FIG. 5 shows a schematic flowchart of a method of operating a TCE according to an embodiment of the present invention.

Using the MME 100 and the TCE 200 as shown in FIGS. 1 to 3, the following method may be carried out, as shown in FIG. 5: At S4, at the TCE 200, after initiation of a user session of an UE 308 and in response to an initiation of a first trace session of the UE 308 during the user session, a first mapping correlation is received from the MME 100 which maps a first trace ID reflecting the first trace session, to a correlation ID assigned to the user session. At S5, at the TCE 200, first trace session information collected during the first trace session is assigned to the user session using the first mapping correlation. At S6, at the TCE 200, in response to an initiation of a second trace session of the UE 308 during the user session, a second mapping correlation is received from the MME 100 which maps a second trace ID reflecting the second trace session, to the correlation ID. At S7, at the TCE 200, second trace session information collected during the second trace session is assigned to the user session using the second mapping correlation.

Figure 6:
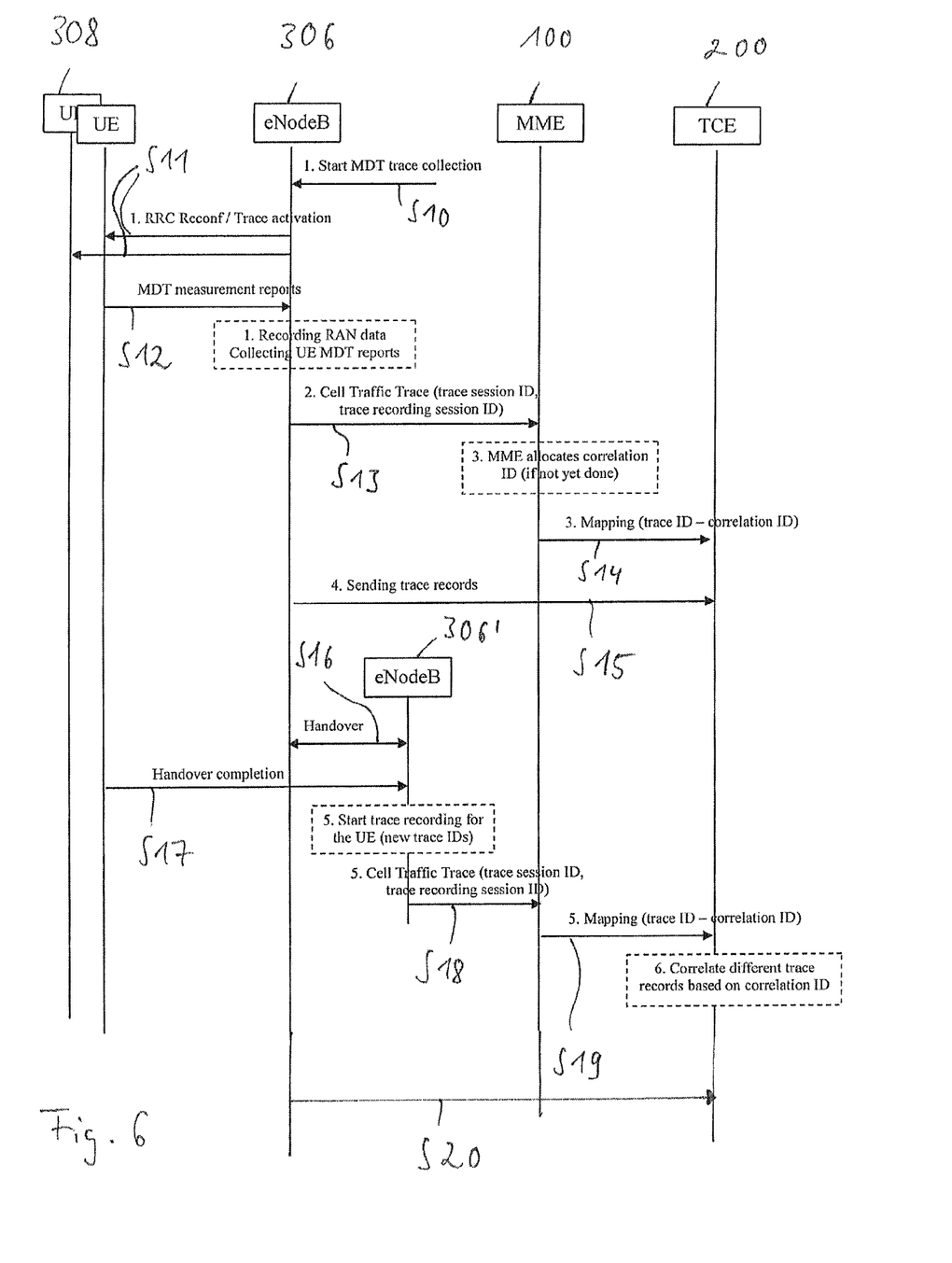
FIG. 6 shows a schematic flowchart of operating a communication network according to an embodiment of the present invention.

FIG. 6 shows an embodiment how the MME 100 and the TCE 200 shown in FIGS. 1 to 3 may be used to operate the communication network 300. FIG. 6 shows the case where the immediate MDT measurement data collection approach is used, but the same procedure would apply for logged MDT measurements as well in an analogue manner.

At S10, an area based MDT measurement is activated at an eNodeB (base station) 306 (for example by receiving, at the eNodeB 306, a corresponding request from a managing unit of the communication network 300 which may also specify for which UEs 308 the MDT measurement data collection process is to be carried out). It is assumed here that the MDT measurement is trace based. At S11, the eNodeB 306 configures the MDT measurements of corresponding UEs 308, and activates the MDT measurement (optionally also radio access network (RAN) measurement) collection processes (trace recording sessions) for each UE 308 for which data collection is to be executed. Upon activation, at S12, the UEs 308 send measurement reports to the eNodeB 306 which are collected at the eNodeB 306 together with the RAN measurement data. At S13, the eNodeB 306 sends a Cell Traffic Trace message for each trace recording session that has been activated per UE 308 to the MME 100. The content of the Cell Traffic Trace message may be the same as that of current communication standards. Optionally, additional information is added to the Cell Traffic Trace message in order to indicate to the MME 100 whether a correlation ID allocation and mapping is required or not. This may depend on various parameters, for example on the trace job time. In response to receiving the Cell Traffic Trace at the MME 100, the MME 100 allocates a correlation ID if requested in the Cell Traffic Trace message received, and if no correlation ID has been allocated yet for that user session. Then, at S14, the MME 100 sends a mapping correlation: ([trace session reference and trace recording session reference] to [correlation ID]) to the TCE 200. The mapping correlation may include a time stamp. The mapping correlation is stored in the TCE 200. At S15, the eNodeB 306 sends the collected trace records comprising the MDT measurement data together with a/the trace session reference and a/the trace recording session reference to the TCE 200.

At S16, the case is shown in which the UE 308 moves from the current cell to another cell, i.e. a handover process occurs which is completed at S17. That is, the UE 308 is now assigned to a new eNodeB 306'. If, in this new eNodeB 306', an area based MDT measurement is activated or has already been activated for the UE 308 (e.g. if the new eNodeB 306' receives or has already received a corresponding request), the new eNodeB 306' will use a new trace session reference and will allocate a new trace recording session reference to the UE 306. Then, at S18, the new eNodeB 306' sends a Cell Traffic Trace message to the MME 100, now including the new trace IDs (new trace session reference and new trace recording session reference). The MME 100 will realize that a correlation ID has been already allocated for the UE 306 and will not allocate a new correlation ID, but will send the mapping correlation: ([new trace IDs] to [already existing correlation ID]) to the TCE 200 at S19. The new mapping correlation and corresponding time stamp information will be stored by the TCE 200 while preserving also the previously received mapping correlation. Then, the new eNodeB 306' will start sending trace records to the TCE 200 at S20, the new trace IDs included in the trace records. During post processing of the trace records (at the TCE 200 or at a different network node), it will be possible to correlate trace records received from the source (old) and target (new) eNodeBs 306, 306' and belonging to the same user session based on the correlation ID.

As has become apparent from the foregoing description, an important aspect of embodiments of the present invention is to introduce a new identifier for correlation purposes, which is not tied to the user identity but rather to a user session, e.g., the period between the UE 306 registers to the core network and when it deregisters. The new identifier is called correlation ID, and it is not assigned to a particular user in a static manner and it may not even be globally unique in a given point in time.

The MME 100 and the TCE 200 use the correlation ID to identify a particular user session or a set of user sessions belonging to the same UE 306. The correlation ID may be allocated by the MME 100 and may be stored as part of user context information throughout the lifetime of the user session. In response to receiving an indication from the communication network 300 for start of a trace session, the MME 100 can send the mapping correlation: ([trace identity] to [correlation identity]) to the TCE 200. The different pieces of information collected in the TCE 200 via different trace sessions but belonging to the same user session can be combined based on the correlation ID during data post processing.

It is noted that the mechanism of using a correlation ID can be applied to any trace based collection mechanism of 3GPP systems. That is, the trace job type can be any of the existing job types, immediate MDT, logged MDT, trace, etc., or any of job types to be defined in later communication standards.

In the following description, further aspects of the present invention will be explained.

In the context of embodiments of the present invention, "the correlation ID comprises a piece of information" means that the piece of information may be included in the correlation ID as it is, or that a function or an encoding of the piece of information (derivative) is included in the correlation ID. For example, it is to be understood that stating that the MME ID is comprised in the correlation ID may mean that the MME ID, or an encoding of the MME ID, or a function of the MME ID (and possibly other parameters) is included in the correlation ID.

Figure 7:
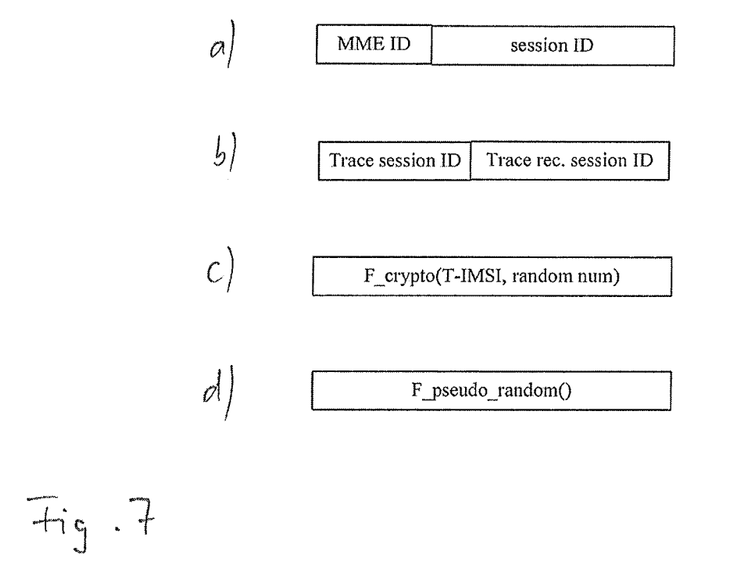
FIG. 7 shows architectures of correlation IDs according to an embodiment of the present invention.

According to one embodiment, the correlation ID comprises an identifier of the MME ID which allocated the correlation ID, and a user session ID (see FIG. 7a). Generally, the correlation ID may be allocated by the MME 200 in a way that it is unique per MME 200. The correlation ID may comprise further parts in addition to the above mentioned parts, for example sequence numbers, random or pseudo random data, further network identifiers, etc.

According to a further embodiment, the correlation ID comprises the trace session ID and trace recording session ID used in the tracing processes, see FIG. 7b. In this embodiment, the MME 100 may, upon receiving a Cell Traffic Trace message for the particular UE 308 for the first time during a user session, store the received trace IDs as part of a user context. When a new trace session is started, e.g. in another cell (after a handover of the UE 308), the MME 100 may use the first received trace IDs to map any further trace IDs to that first ID. In addition, the MME ID may be added to the trace session ID and trace recording session ID.

According to a still further embodiment, the correlation ID is derived from the IMSI or a temporary IMSI of the UE 308 using a hash function or using a cryptographical function where a secret key needs to be used to derive the correlation ID from IMSI or temporary IMSI, see FIG. 7c. The secret key could for example be the CK/IK for the particular user (in UMTS) or the $K_{ASME}$ (in LTE (Long Term Evolution)), or a secret key generated by the MME 100 itself, which the MME 100 maintains and passes on to other MMEs/SGSN/MSC (Mass Storage Class) at mobility where the core network node is changed. In yet another variant the mapping from IMSI to correlation ID is tweaked with a random number, a sequence number, the identity of the serving network, the identity of the MME 100 (in any combination) or possibly other parameters.

Also, according to one embodiment, the (temporary) correlation ID may be generated as a (pseudo) random string which is long enough to be statistically unique in the communication network, see FIG. 7d.

The correlation ID may be generated using an arbitrary combination of the above listed correlation ID embodiments.

The MME 100 may generate a correlation ID when it receives an indication that a trace session (e.g., MDT or RLF) has been started in the RAN. This indication may be provided in the form of a Cell Traffic Trace message in case of E-UTRAN. In case of UTRAN when the RNC starts a trace recording for a UE 308, the MME 100 may reserve the correlation ID and use it in any trace record reporting to the TCE 200 during that trace session of the UE 308. It is also possible that the MME 100 generates the correlation identity in advance, e.g., at the start of a user session, but does not start using it until an indication for a trace initiated in the RAN arrives at the MME 100.

When allocating the session ID part of the correlation ID in case of embodiment A, the MME 100 should allocate the session ID such that it remains (at least statistically) unique within the MME 100 and should reuse an already allocated identity at the latest possible point in time.

After allocation of the correlation ID, the MME 100 may store and preserve the correlation ID as part of the user context until completion of user session or reallocation of correlation ID. The MME 100 may reallocate a new correlation ID during an ongoing user session but may also maintain the same correlation ID throughout multiple user sessions.

In one embodiment, the MME 100 may generate a correlation ID when it sets up the user session, and propagate the correlation ID via network signaling to the RAN. In case of area based logged MDT, the eNB/RNC may forward the correlation ID to the UE which stores it and sends it back to the MME 100 in the MDT log.

The correlation ID may be released when the corresponding user session ends, which may correspond to a detach state of the UE 308, but it could also be the end of an active session, i.e., when going from a connected state to an idle state. Generally, the release of the correlation ID may depend on the particular realization of the communication network and the needs of the application. The user session may for example last as long as the UE is registered in the core network (being in a EMM_REGISTERED state), i.e., between an attach and detach, but may also last for a time between a RRC_CONNECTED state and a RRC_IDLE state, or last as long as the UE 308 stays in the same location area or tracking area (or as long as the UE 308 stays in the same cell).

The correlation ID may also be released (de-allocated) when a particular trace collection (e.g., MDT or RLF) is deactivated for that UE 308 and/or some maximum time duration expires.

The correlation ID may in particular be released if any of the following conditions are satisfied:

a) The corresponding user session ends, e.g., a detach occurs (or an active to idle transition occurs). This is visible for the MME 100, thus the MME 100 can release the correlation ID allocation.

b) The corresponding user session ends plus some timer controlled duration expires (the timer controlled duration starts after the user session has ended). It is visible for the MME 100, thus the MME can release the correlation ID allocation.

c) The corresponding trace collection is deactivated. This may not be directly visible for the MME 100, e.g., in case of cell trace. For example, if the UE 308 goes to a cell where no tracing is activated, the correlation ID may no longer be needed and could be released. In such cases, the MME 100 may, after the UE 308 has performed a handover, wait for a timer controlled period, and if no Cell Trace message is received at the MME 100, the MME 100 may release the correlation ID.

d) In case of area based logged MDT, and in case that the correlation ID consists of trace session ID and a trace recording session ID, the correlation ID release may be done after the trace recording session (/trace session) has expired.

In case that the TCE 200 controls its operation based on whether the correlation ID is valid or not, the MME 100 may inform the TCE 200 if the MME has released the correlation ID. The TCE 200 may then perform any necessary cleanup processing.

When the MME 100 receives a Cell Traffic Trace message indicating that a trace recording has been started for a certain UE 308 in the RAN 302, the MME 100 may allocate the correlation ID (if it has not been allocated before) and send it as part of the mapping message to the TCE 200. The mapping information sent to the TCE 200 may include the correlation: [trace session reference ID and the trace recording session reference ID mapped to correlation ID].

Including the correlation ID in the mapping message may depend on the trace job type, e.g., it may be sent only in case of a particular trace job type like a MDT or RLF job type.

In case that there are multiple trace recording sessions ongoing for the same UE (e.g., an MDT measurement collection and RLF measurement collection), each of these trace sessions may have their own trace IDs which will eventually be mapped to the same correlation ID. Thereby, different pieces of information from different trace sessions but belonging to the same user session can be correlated.

In case of UTRAN, the RNC 302 may allocate and include in the trace records the corresponding correlation ID, i.e., there is no need to send explicit mapping information to the Core Network 304 (SGNS) (this corresponds to legacy behavior in the current UTRAN solution.)

In the case of LTE, after allocation of the correlation ID in the MME 100, the MME 100 may distribute the correlation ID to the eNodeB 306, and the eNodeB 306 may then include the correlation ID into the trace records. In this case, the eNodeB 306 needs to include the same correlation ID in the trace records of all trace sessions and trace recording sessions which are collected from the UE 308. Multiple trace sessions of different job types may collect data about the same UE 308. In case of a handover process, the source eNodeB 306 may pass the correlation ID to the target eNodeB 306'. Further, the correlation ID may be allocated by the eNodeB 306 itself and passed to other eNodeBs 306' as soon as a handover processes occur.

In case of relocation of the MME 100, the correlation ID may be passed from the old MME 100 to the new MME 100 as part of the user context (or as a separate IE). The MME 100 receiving a correlation ID as a part of the user context may use the received correlation ID from the time of reception onwards for that user session (until de-allocation occurs).

In case of UTRAN and an RNC relocation, the correlation ID may be transferred between the RNC 302 via the SRNS context transfer procedure.

In case the source MME 100 is updated to use correlation IDs, but the target (new) MME 100 is not, the target MME 100 may discard the information in the received IE.

The correlation ID may be transferred during RAT (Radio Access Technology) changes, thereby making it possible to analyze and track network performance problems related to RAT borders, for instance.

When switching from E-UTRAN to UTRAN, the MME 100 may pass the correlation ID as part of the user context to the SGSN. Then the SGSN needs to propagate the correlation ID to the RNC, for which the CN INVOKE TRACE (a communication protocol exchanged between the RAN and the core network (CN). The CN INVOKE TRACE communication protocol may be used to convey the proposed information; it is specified in 3GPP specification 25.413) message may be used.

When switching from UTRAN to E-UTRAN, the RNC may propagate the correlation ID via the SRNS CONTEXT FORWARD (a communication protocol exchanged between the RAN and the core network (CN). The SRNS CONTEXT FORWARD communication protocol may be used to convey the proposed information; it is specified in 3GPP specification 25.413) message.

The use of a correlation ID to identify and correlate different pieces of information that belong together can be generally applied for cases when information is reported from multiple network nodes of different kinds, i.e., not only from the eNodeB (in the case of E-UTRAN) or from the RNC (in the case of UTRAN), but also for core network nodes, such as MMS, SGSN and IMS (IP Multimedia Subsystem) nodes such the PCRF (Policy and Charging Control Function), etc.

If a trace session is initiated in any of these other network nodes via management based activation, each network node may initiate a trace session and trace recording session with their unique IDs for the recorded user sessions. The mapping to correlation ID can be done similarly as in case of a RAN (eNodeB or RNC) initiated trace collection, i.e. the mapping can be performed by the network node owning the correlation ID, which would be the MME (in the LTE case). For this reason there may be a need to convey the request for trace ID to correlation ID mapping via network signaling also from core network nodes to the MME (to the mapping network node).

Another possibility is to propagate the correlation ID to other network nodes via network signaling in cases where the network signaling is anyway used as trigger to initiate tracing in other network nodes. This can be the case, for instance, when the MME 100 or SGSN propagate the trace request to IMS nodes or to other core network nodes. In these cases the correlation ID can be directly put into the trace file as generated by the tracing node.

An advantage of embodiments of the present invention is that different types of information potentially collected within different trace sessions (e.g., MDT or other job types) and/or in different cells but belonging to the same user session can be combined. Thereby, advanced use cases built on top of MDT data are enabled that can take advantage by analyzing correlated data.

In the foregoing, principles, embodiments and various modes of implementing the technique disclosed herein have exemplarily been described. The present invention should not be construed as being limited to the particular principles, embodiments and modes discussed herein. Rather, it will be appreciated that various changes and modifications may be made by a person skilled in the art without departing from the scope of the present invention as defined in the claims that follow.

The invention claimed is:

1. A method of operating a Mobility Management Entity, MME, within a communication network comprising a radio access network and a core network connected to the radio access network, wherein the radio access network comprises a plurality of base stations wirelessly connected to a plurality of mobile user equipments, UEs, and wherein the MME is part of the core network,
the method comprising:
a) assigning, at the MME, after initiation of a user session of an UE, a correlation ID to the user session;
b) defining, at the MME, in response to an initiation of a first trace session of the UE during the user session, a first mapping correlation which maps a first trace ID reflecting the first trace session, to the correlation ID, and sending the first mapping correlation to a trace collection entity, TCE; and
c) defining, at the MME, in response to an initiation of a second trace session of the UE during the user session, a second mapping correlation which maps a second trace ID reflecting the second trace session, to the correlation ID, and sending the second mapping correlation to the TCE;
wherein the first mapping correlation and the second mapping correlation enable the TCE to assign trace session information collected during the first trace session and the second trace session to the user session, and
wherein the correlation ID does not comprise UE International Mobile Station Equipment information and does not comprise International Mobile Subscriber Identity information.

2. The method according to claim 1,
wherein the correlation ID is assigned to the user session such that it is unique with regard to other correlation IDs assigned by the MME to user sessions of other UEs.

3. The method according to claim 1,
wherein the assignment of the correlation ID to the user session of the UE is released based on after the user session has been terminated.

4. The method according to claim 1,
wherein the assignment of the correlation ID to the user session of the UE is released during the user session.

5. The method according to claim 4,
wherein the assignment of the correlation ID to the user session of the UE is released based on when a mode of the user session has changed.

6. The method according to claim 1,
wherein the assignment of the correlation ID to the user session of the UE is released based on when the first trace session or the second trace session is deactivated.

7. The method according to claim 1,
wherein the assignment of the correlation ID to the user session of the UE is released based on when:
a predetermined time period expires; or
the UE leaves a predefined geographical area; or
the UE changes from a state connected to the core network to a state disconnected to the core network.

8. The method according to claim 1,
wherein the correlation ID comprises at least one of: a combination of a trace session ID and an MME ID, a combination of a trace session ID and a trace session recording ID, a string or a number obtained by a function having an International Mode Subscriber Identity, IMSI, as an input parameter, a random number, and a Temporary-IMSI, or a function thereof.

9. The method according to claim 1,
wherein the correlation ID is generated within the MME.

10. The method according to claim 1,
wherein, in case that the assignment of the correlation ID to the user session of the UE is released, the MME informs the TCE about the release.

11. The method according to claim 1,
wherein, in response to a release of an assignment of the correlation ID to the user session of the UE, and in response to an initiation of a further user session for the UE, method steps a) to c) are repeated for the further user session.

12. The method according to claim 1,
wherein the trace session information includes both a trace session reference and a trace recording session reference.

13. The method according to claim 1,
wherein, in response to an initiation of the first trace session or second trace session of the UE by a base station, it is examined by the MME whether information has been received from the base station which indicates that a mapping correlation is required during the first trace session or second trace session, wherein the MME only creates the mapping correlation and sends it to the TCE if such information has been received by the base station.

14. The method according to claim 1,
wherein the MME transmits the correlation ID to another MME during the user session when the responsibility for handling a user session of a UE is shifted to the another MME.

15. A method of operating a trace collection entity, TCE, within a communication network comprising a radio access network and a core network connected to the radio access network, wherein the radio access network comprises a plurality of base stations wirelessly connected to a plurality of mobile user equipments, UEs,
the method comprising:
a) receiving, at the TCE, after initiation of a user session of an UE and in response to an initiation of a first trace session of the UE during the user session, a first mapping correlation which maps a first trace ID reflecting the first trace session, to a correlation ID assigned to the user session, from a mobile managing entity, MME, which is part of the core network, wherein the correlation ID does not comprise UE International Mobile Station Equipment information and does not comprise International Mobile Subscriber Identity information;
b) assigning, at the TCE, first trace session information collected during the first trace session to the user session using the first mapping correlation;
c) receiving, at the TCE, in response to an initiation of a second trace session of the UE during the user session, a second mapping correlation which maps a second trace ID reflecting the second trace session, to the correlation ID, from the MME; and
d) assigning, at the TCE, second trace session information collected during the second trace session to the user session using the second mapping correlation.

16. A method of operating a communication network comprising a radio access network and a core network connected to the radio access network, wherein the radio access network comprises a plurality of base stations wirelessly connected to a plurality of mobile user equipments, UEs, and wherein the core network comprises a MME,
the method comprising:
a) assigning, at the MME, after initiation of a user session of an UE, a correlation ID to the user session, wherein the correlation ID does not comprise UE International Mobile Station Equipment information and does not comprise International Mobile Subscriber Identity information;
b) defining, at the MME, in response to an initiation of a first trace session of the UE during the user session, a first mapping correlation which maps a first trace ID reflecting the first trace session, to the correlation ID, and sending the first mapping correlation to a TCE;
c) assigning, at the TCE, first trace session information collected during the first trace session to the user session using the first mapping correlation;
d) defining, at the MME, in response to an initiation of a second trace session of the UE during the user session, a second mapping correlation which maps a second trace ID reflecting the second trace session, to the correlation ID, and sending the second mapping correlation to the TCE; and
e) assigning, at the TCE, second trace session information collected during the second trace session to the user session using the second mapping correlation.

17. A computer program product comprising program code portions stored on a non-transitory computer-readable recording medium for performing the steps of claim 1 when the computer program product is executed on one or more computing devices.

18. A Mobility Management Entity, MME, which can be operated within a communication network comprising a radio access network and a core network connected to the radio access network, wherein the radio access network comprises a plurality of base stations wirelessly connected to a plurality of mobile user equipments, UEs,
the MME comprising a processing unit adapted to:
a) assign, after initiation of a user session of an UE, a correlation ID to the user session, wherein the correlation ID does not comprise UE International Mobile Station Equipment information and does not comprise International Mobile Subscriber Identity information;
b) define, in response to an initiation of a first trace session of the UE during the user session, a first mapping correlation which maps a first trace ID reflecting the first trace session, to the correlation ID; and
c) define, in response to an initiation of a second trace session of the UE during the user session, a second mapping correlation which maps a second trace ID reflecting the second trace session, to the correlation ID;
the MME further comprising a transmitting unit adapted to send the first mapping correlation and the second mapping correlation to a TCE,
wherein the first mapping correlation and the second mapping correlation enable the TCE to assign trace session information collected during the first trace session and the second trace session to the user session.

19. A trace collection entity, TCE, which can be operated in a communication network comprising a radio access network and a core network connected to the radio access network, wherein the radio access network comprises a plurality of base stations wirelessly connected to a plurality of mobile user equipments, UEs,
the TCE comprising a receiving unit adapted to:
a) receive, after initiation of a user session of an UE and in response to an initiation of a first trace session of the UE during the user session, a first mapping correlation which maps a first trace ID reflecting the first trace session, to a correlation ID assigned to the user session, from a MME, wherein the correlation ID does not comprise UE International Mobile Station Equipment information and does not comprise International Mobile Subscriber Identity information; and
b) receive, in response to an initiation of a second trace session of the UE during the user session, a second mapping correlation which maps a second trace ID reflecting the second trace session, to the correlation ID, from the MME;
the TCE further comprising a processing unit adapted to assign first trace session information collected during the first trace session to the user session using the first mapping correlation and second trace session information collected during the second trace session to the user session using the second mapping correlation.

* * * * *